United States Patent
Osumi et al.

(10) Patent No.: US 6,375,317 B1
(45) Date of Patent: Apr. 23, 2002

(54) INK, INK-JET RECORDING PROCESS, RECORDING UNIT, INK CARTRIDGE AND INK-JET RECORDING APPARATUS

(75) Inventors: Koichi Osumi; Shinya Mishina, both of Kawasaki; Mikio Sanada, Yokohama; Hisashi Teraoka, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,782

(22) Filed: Oct. 18, 1999

(30) Foreign Application Priority Data

Oct. 27, 1998 (JP) .............................. 10-305988

(51) Int. Cl.[7] .............................................. G01D 11/00
(52) U.S. Cl. ..................................................... 347/100
(58) Field of Search ................................ 347/100, 105; 106/20 D, 32; 534/829, 830

(56) References Cited

U.S. PATENT DOCUMENTS

| | | | |
|---|---|---|---|
| 5,053,495 A | 10/1991 | Greenwood et al. | 534/829 |
| 5,554,739 A | 9/1996 | Belmont | 534/885 |
| 5,571,311 A | 11/1996 | Belmont et al. | 106/20 R |
| 5,750,086 A * | 5/1998 | You | 423/432 |
| 5,976,233 A | 11/1999 | Osumi et al. | 106/31.86 |

FOREIGN PATENT DOCUMENTS

| | | |
|---|---|---|
| JP | 4-226175 | 8/1992 |
| JP | 5-179183 | 7/1993 |
| JP | 6-136311 | 5/1994 |
| JP | 7-53841 | 2/1995 |

* cited by examiner

*Primary Examiner*—Anh T. N. Vo
(74) *Attorney, Agent, or Firm*—Fitzpatrick, Cella, Harper & Scinto

(57) ABSTRACT

An ink comprising particles of self-dispersing carbon black having at least one hydrophilic group at the surface thereof, and calcium in an aqueous medium. The ink can form images excellent in fastness properties such as water fastness and light fastness and character quality, and can be stably ejected from a recording head irrespective of printing environment.

15 Claims, 3 Drawing Sheets

INK, INK-JET RECORDING PROCESS, RECORDING UNIT, INK CARTRIDGE AND INK-JET RECORDING APPARATUS

BACKGROUND OF THE INVENTION

1. Field of the Invention

The present invention relates to an ink, an ink-jet recording process, a recording unit, an ink cartridge and an ink-jet recording apparatus.

2. Related Background Art

With the spread of ink-jet recording systems, it is advanced to improve the quality and fastness properties of prints. With respect to fastness properties of prints, for example, water fastness, Japanese Patent Application Laid-Open No. 4-226175 and U.S. Pat. No. 5,053,495 disclose novel black dyes and inks which can provide images having good water fastness.

Black inks using a pigment have been reported to form black images excellent in print quality and fastness properties such as water fastness and light fastness on plain paper. For example, Japanese Patent Application Laid-Open No. 5-179183 discloses a pigment ink stabilized with a block polymer of the AB or BAB type. Japanese Patent Application Laid-Open No. 6-136311 discloses a pigment ink which comprises a block polymer composed of a hydrophobic polymer having basic amine functional groups and a hydrophilic polymer having nonionic and acid functional groups, can provide prints of excellent quality and has excellent dispersion stability. Japanese Patent Application Laid-Open No. 7-53841 has proposed a pigment ink for ink-jet, which comprises a triblock polymer of the ABC type, has excellent dispersion stability and can provide prints of excellent quality.

On the other hand, pigment inks using, as a coloring material, the so-called self-dispersing carbon black which has no need to add any dispersing agent to the inks have been proposed with a view toward improving the ejection stability thereof upon ink-jet recording. For example, U.S. Pat. Nos. 5,554,739 and 5,571,311 disclose a production process of self-dispersing carbon black to the surface of which at least one hydrophilic group is bonded directly or through another atomic group. A pigment ink comprising such self-dispersing carbon black can provide prints of excellent quality and has excellent dispersion stability without using any block polymer.

SUMMARY OF THE INVENTION

According to an investigation by the present inventors as to inks comprising self-dispersing carbon black as a coloring material, it has been observed that even when preset conditions of an apparatus as to printing when conducting ink-jet recording using such a pigment ink are uniform, the ejection quantity of the ink may vary with printing environment in some cases. Therefore, the present inventors have carried out a further detailed investigation as to the relationship between such variation of the ejection quantity and the composition of the ink comprising the self-dispersing carbon black. As a result, it has been found that when calcium is contained in a pigment ink of such a composition, the ink can be effectively prevented from varying the ejection quantity with printing environment when the ink is applied to ink-jet recording.

It is thus an object of the present invention to provide a pigment ink which can form images excellent in fastness properties such as water fastness and light fastness and high in character quality, and can be stably ejected from a recording head irrespective of printing environment when the ink is applied to ink-jet recording.

Another object of the present invention is to provide an ink-jet recording process which permits the stable formation of images excellent in water fastness and light fastness and high in quality.

A further object of the present invention is to provide a recording unit, an ink cartridge and an ink-jet recording apparatus which permit the stable provision of images excellent in water fastness and light fastness and high in quality by ink-jet recording.

The above objects can be achieved by the present invention described below.

According to a first aspect of the present invention, there is thus provided an ink comprising particles of self-dispersing carbon black having at least one hydrophilic group at the surface thereof, and calcium in an aqueous medium.

According to another aspect of the present invention, there is also provided an ink-jet recording process, comprising the step of applying energy to an ink to eject the ink from an orifice toward a recording medium, thereby making a record on the recording medium, wherein the ink comprises particles of self-dispersing carbon black having at least one hydrophilic group at the surface thereof, and calcium in an aqueous medium.

According to another aspect of the present invention, there is further provided a recording unit comprising an ink container portion containing an ink, and a head portion from which the ink is ejected, wherein the ink comprises particles of self-dispersing carbon black having at least one hydrophilic group at the surface thereof, and calcium in an aqueous medium.

According to another aspect of the present invention, there is still further provided an ink cartridge comprising an ink container portion containing an ink, wherein the ink comprises particles of self-dispersing carbon black having at least one hydrophilic group at the surface thereof, and calcium in an aqueous medium.

According to a further aspect of the present invention, there is yet still further provided an ink-jet recording apparatus comprising a recording unit which has an ink container portion containing an ink comprising particles of self-dispersing carbon black having at least one hydrophilic group at the surface thereof, and calcium in an aqueous medium, and a recording head for ejecting the ink from an orifice by applying energy to the ink fed from the ink container portion.

According to still further aspect of the present invention, there is yet still further provided an ink-jet recording apparatus comprising an ink cartridge equipped with an ink container portion which contains an ink comprising particles of self-dispersing carbon black having at least one hydrophilic group at the surface thereof, and calcium in an aqueous medium; and a recording head for ejecting the ink from an orifice by applying energy to the ink fed from the ink container portion.

By adopting the above-described respective constitutions according to the present invention, there can be brought about an effect that images excellent in fastness properties such as water fastness and light fastness and high in quality can be stably formed in ink-jet recording.

The reason why the variation of the ejection quantity can be prevented by adding calcium is considered to be as follows.

First of all, the printing environment in the present invention includes various factors. In particular, in the same head, some nozzles may eject an ink in a considerably great amount, and other nozzles may scarcely eject the ink according to recording conditions upon printing. Such a difference in ejection quantity between nozzles is also considered as a printing environment. The present inventors have carried out various investigations as to a phenomenon that the ejection quantity of an ink varies with nozzles even under the same preset conditions in the apparatus when printing environments differ from each other. As a result, it has been newly found that the ejection quantity of an ink varies according to the form of a film of a pigment formed on the surface of a heater upon ejection of a pigment ink by a bubble jet system (system that thermal energy is applied to the ink using the heater to eject the ink from an orifice), and a difference between ejection quantities of the ink ejected from respective orifices reduces as a difference in form between films formed on respective heaters lessens, and that impurities in a pigment ink comprising self-dispersing carbon black to the surface of which at least one hydrophilic group is bonded through another atomic group, particularly, impurities derived from the self-dispersing carbon black to the surface of which at least one hydrophilic group is bonded through another atomic group participate in ejection stability. It is thus considered from these findings that the effect of the present invention is achieved by the following action.

Namely, for example, in the ink-jet recording system that thermal energy is applied to an ink to eject the ink, voltage is applied to a heater to rapidly heat the heater, whereby the ink adjacent to the surface of the heater reaches the limit of heating to generate bubbles, thereby ejecting the ink. The generation of bubbles tends to be affected by the condition of the heater surface, and so the ejection of the ink is greatly influenced by the condition of the heater surface. In the pigment ink according to the present invention, a stable film of a pigment can be rapidly formed on the surfaces of the respective heaters by the interaction between calcium and the above-described impurities in the pigment ink so far as the ink is more or less ejected from all nozzles. The film is always stably present irrespective of the ejection quantity of the ink after this, so that the forms of the pigment films on the respective heaters become substantially the same irrespective of the quantity of the ink ejected from the respective nozzles. As a result, the ejection quantities from the respective nozzles become substantially the same, and so variation in ejection quantity between the respective nozzles with recording environment is also narrowed.

DESCRIPTION OF THE PREFERRED EMBODIMENTS

Figure 1:
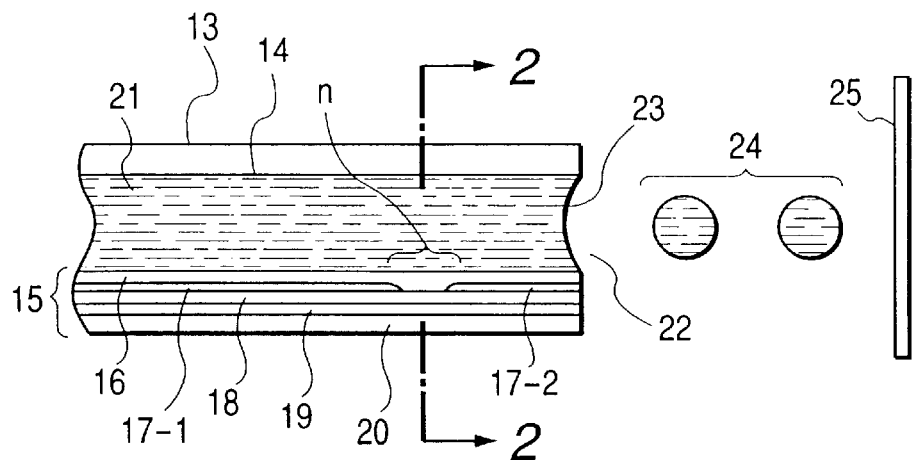
FIG. 1 is a longitudinal cross-sectional view illustrating a head of an ink-jet recording apparatus according to an embodiment.

The present invention will hereinafter be described in detail by the preferred embodiments of the invention.

(Water-based pigment inks)

A feature of the pigment inks according to an embodiment of the present invention resides in that the inks comprise particles of self-dispersing carbon black to the surface of which at least one hydrophilic group is bonded through an atomic group as needed, and calcium in an aqueous medium. The individual components of the inks according to the present invention will hereinafter be described in order.

(Self-dispersing carbon black)

In the water-based pigment inks according to the present invention, it is preferred that particles of self-dispersing carbon black having at least one hydrophilic group at the surface thereof be contained as a coloring material, and the hydrophilic group be bonded to the carbon black particles through an atomic group functioning as an atomic group as needed. The use of such carbon black as a coloring material makes needless to add a dispersing agent for dispersing carbon black like the conventional pigment inks. The self-dispersing carbon black preferably has an ionicity in view of its dispersibility in an ink, and for example, that charged anionically or cationically is preferably used.

In the case of the anionically charged carbon black, examples of the hydrophilic group bonded to the surface thereof through an atomic group include —COOM, —SO$_3$M, —PO$_3$HM and —PO$_3$M$_2$, wherein M is hydrogen, alkali metal, ammonium or organic ammonium. Anionically charged self-dispersing carbon black with at least one of —COOM and —SO$_3$M among these groups bonded to the surface thereof through an atomic group is particularly preferably used because its dispersibility in an ink is good. With respect to "M" in the above-described hydrophilic groups, examples of the alkali metal include lithium, sodium and potassium, and examples of the organic ammonium include mono-, di- or trimethylammonium, mono-, di- or triethylammonium, and mono-, di- or trimethanolammonium.

As a method for preparing the anionically charged self-dispersing carbon black, may be mentioned a method in which an —Ar—COONa group, wherein Ar denotes an arylene group, is bonded to the surface of carbon black, for example, by bonding a diazonium salt, which is obtained by reacting nitrous acid on an NH$_2$—Ar—COONa, to the surface of carbon black. It goes without saying that the present invention is not limited to this method. Examples of the cationically charged carbon black include those with at least one selected from the group, for example, consisting of the following quaternary ammonium groups bonded to the surface of carbon black.

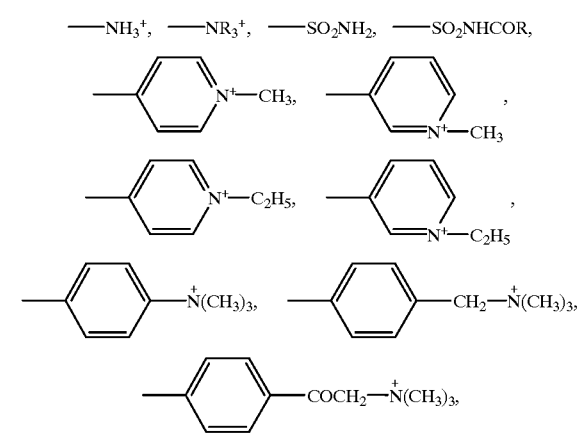

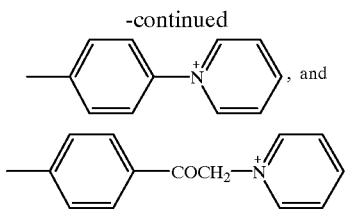

wherein R is an alkyl group having 1 to 12 carbon atoms, a substituted or unsubstituted phenyl group, or a substituted or unsubstituted naphthyl group.

As a method for preparing the cationically charged self-dispersing carbon black with such a hydrophilic group as described above bonded to the surface thereof, a description is given taking the case of a method for bonding, for example, an N-ethylpyridyl group of the formula

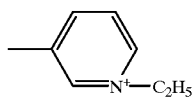

to the surface of carbon black. Namely, there is mentioned a method in which carbon black is treated with 3-amino-N-ethylpyridinium bromide. It goes without saying that the present invention is not limited to this method. The carbon black anionically or cationically charged by introducing the hydrophilic group into the surface thereof as described above has excellent dispersibility in water by virtue of repulsion of the ion thereof, and hence stably retains its dispersed state without adding any dispersing agent even when it is contained in a water-based ink.

By the way, it is preferred that such various hydrophilic groups as mentioned above be bonded to the polymer chain of carbon through an atomic group. Examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of the atomic group and the hydrophilic group include —$C_2H_4$COOM, —PhSO$_3$M and —PhCOOM, wherein Ph is a phenylene group. It goes without saying that the present invention is not limited to these combinations.

In the present invention, the self-dispersing carbon black is not limited to one kind, and two or more kinds of such carbon black may be used in combination to adjust the color tone of the ink. The amount of the self-dispersing carbon black to be added in the pigment inks according to the present invention is preferably within a range of from 0.1 to 15% by weight, more preferably from 1 to 10% by weight based on the total weight of each ink. When the self-dispersing carbon black is added within this range, the satisfactorily dispersed state thereof can be retained in the inks. In addition to the self-dispersing carbon black, a dye may be added for the purpose of, for example, adjusting the color tone of the inks.

(Aqueous medium)

The aqueous medium contained in the water-based pigment inks according to the present invention is composed of water alone or a mixed solvent of water and a water-soluble organic solvent. It is particularly preferred that the water-soluble organic solvent should have an effect of preventing the drying of the inks. With respect to the water, it is desirable to use deionized water instead of tap water containing various ions. Specific examples of the water-soluble organic solvent used in the present invention include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. Such water-soluble organic solvents as mentioned above may be used either singly or in any combination thereof.

No particular limitation is imposed on the content of such water-soluble organic solvents as mentioned above contained in the water-based pigment inks according to the present invention. However, it is preferably within a range of from 3 to 50% by weight based on the total weight of each ink. On the other hand, the content of water contained in the inks is preferably within a range of from 50 to 95% by weight based on the total weight of each ink.

(Calcium)

Calcium is preferably present as a calcium ion in the aqueous medium. Calcium may be added in the form of calcium hydroxide, a calcium salt or both thereof so far as it may be present as a calcium ion.

(Content of calcium)

The content of calcium in the water-based pigment inks varies according to the kind of calcium used. However, calcium is preferably contained in such a range that the concentration in the term of Ca in the ink amounts to 0.1 to 100 ppm, particularly 0.1 to 50 ppm, further particularly 0.1 to 10 ppm, since the effect of improving the ejection efficiency and ejection stability of the pigment ink containing the self-dispersing carbon black is brought about, and moreover the storage stability of the ink is not adversely affected.

(Other components)

The water-based pigment inks according to the present invention may contain, in addition to the above-described components, a surfactant, an antifoaming agent, an antiseptic, a mildewproofing agent and the like, as needed, to provide them as inks having desired physical properties. Further, a commercially-available water-soluble dye or the like may be added. As the surfactant, there may be used one selected from among anionic surfactants, nonionic surfactants and cationic surfactants.

(Ink-jet ejection properties of ink)

The pigment inks according to the present invention may be used as inks for writing utensils and inks for ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to the present invention may be suitably used in these recording methods.

In particular, the effect of these inks can be enjoyed best when they are used in the recording method using thermal energy. When the inks are used for ink-jet recording, it is preferable for the inks to have such properties that they can be ejected from an ink-jet head. From the viewpoint of the ejecting ability from the ink-jet head, the inks according to the present invention may desirably be controlled so as to have, as their own physical properties, a viscosity of $1\times10^{-3}$ to $15\times10^{-3}$ Pa·s (1 to 15 cP), particularly $1\times10^{-3}$ to $5\times10^{-3}$ Pa·s (1 to 5 cP) and a surface tension of at least $25\times10^{-5}$ N/cm (25 dyn/cm), particularly $25\times10^{-5}$ to $50\times10^{-5}$ N/cm (25 to 50 dyn/cm). Preferable examples of the composition of an aqueous medium, which can impart such properties as described above to the inks according to the respective embodiments described above, include those comprising glycerol, trimethylolpropane, thiodiglycol, ethylene glycol, diethylene glycol, triethylene glycol, isopropyl alcohol and acetylene alcohol. Examples of the acetylene alcohol, may be mentioned acetylene alcohols represented by the chemical formula

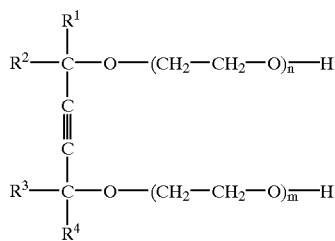

wherein $R^1$, $R^2$, $R^3$ and $R^4$ are independently an alkyl group, specifically, a linear or branched alkyl group having 1 to 4 carbon atoms, and m and n are independently an integer, with the proviso that m=0, n=0 or $1\leq m+n \leq 30$, and m or n is 0 in the case of m+n=1.

(Ink-jet recording apparatus)

Figure 2:
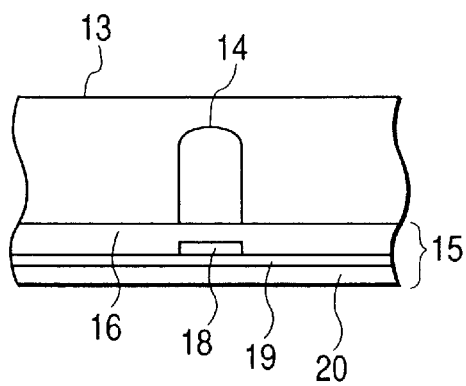
FIG. 2 is a cross-sectional view of the head taken along line 2—2 in FIG. 1.
Figure 3:
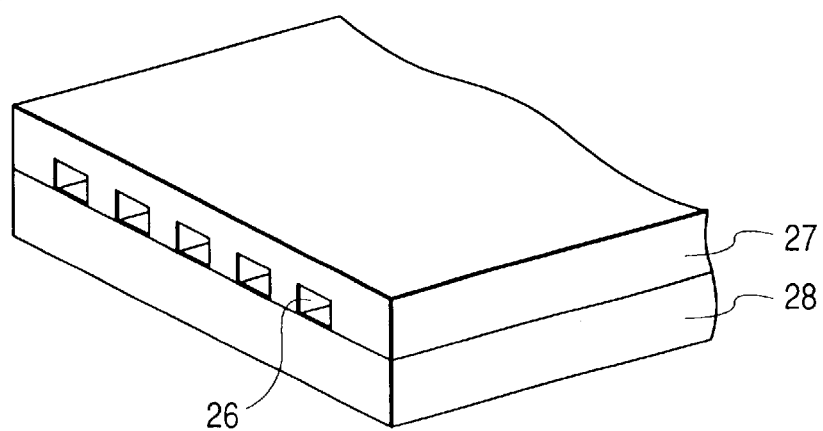
FIG. 3 schematically illustrates a multi-head.

As ink-jet recording apparatus, examples of the construction of a head, which is a main component of an ink-jet recording apparatus making good use of thermal energy, are first illustrated in FIGS. 1, 2 and 3. FIG. 1 is a cross-sectional view of a head 13 taken along the flow path of an ink 21, and FIG. 2 is a cross-sectional view taken along line 2—2 in FIG. 1. The head 13 is formed by bonding a glass, ceramic, silicon or plastic plate or the like having a flow path (nozzle) 14 through which the ink 21 is passed, to a heating element base 15. The heating element base (heating head) 15 is composed of a protective layer 16 formed with silicon oxide, silicon nitride, silicon carbide or the like, electrodes 17-1 and 17-2 made of aluminum, gold, aluminum-copper alloy or the like, a heating resistor layer 18 formed from a high-melting material such as $HfB_2$, TaN or TaAl, a heat accumulating layer 19 formed with thermally oxidized silicon, aluminum oxide or the like, and a substrate 20 formed with silicon, aluminum, aluminum nitride or the like having good heat radiating property. Upon application of electric pulse signals to the electrodes 17-1 and 17-2 in the head 13, the heating element base 15 rapidly generates heat at the region shown by n to form bubbles in the ink 21 which is in contact with the surface of this region. A meniscus 23 of the ink 21 is projected by the action of the pressure thus produced, and the ink 21 is ejected through the nozzle 14 of the head to fly out of an ejection orifice 22 toward a recording medium 25 in the form of ink droplets 24. Reference numerals in FIG. 2 have the same meanings as in FIG. 1.

Figure 4:
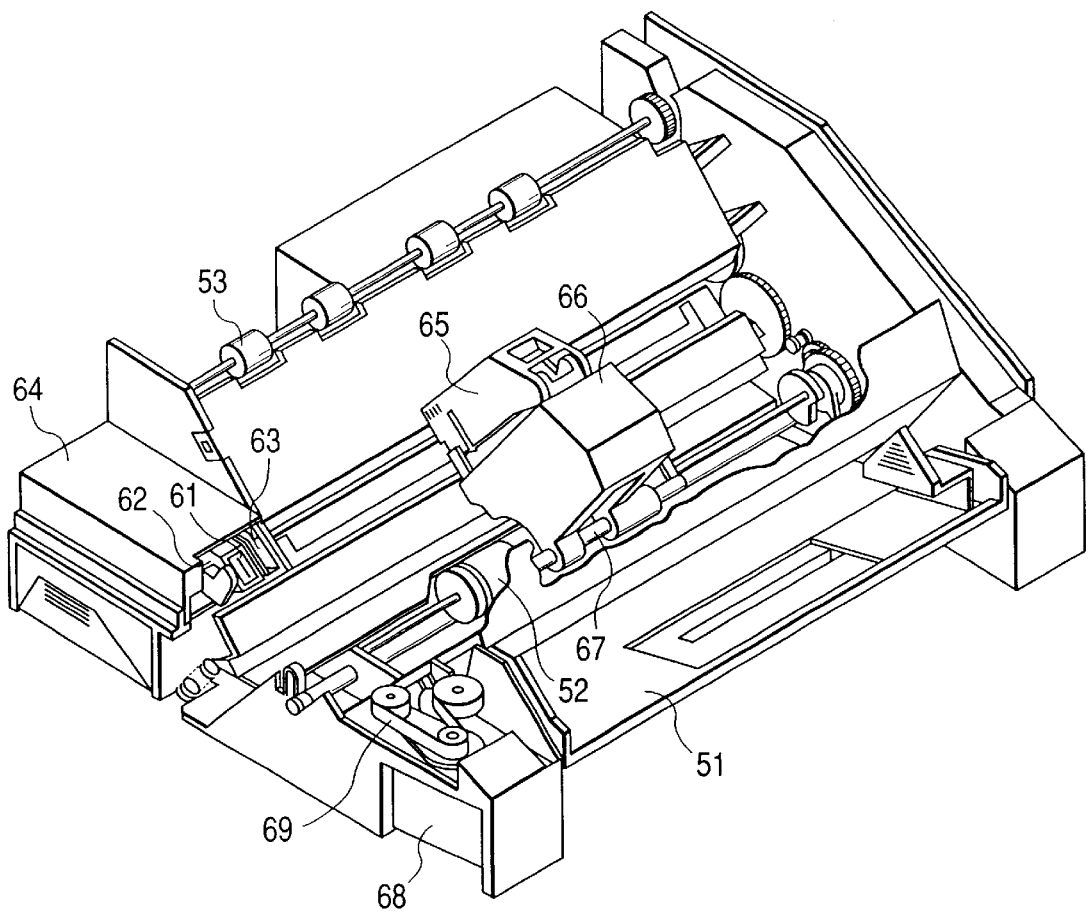
FIG. 4 is a schematic perspective view illustrating an recording apparatus according to an embodiment.

FIG. 3 illustrates an appearance of a multi-head composed of an array of a number of heads as shown in FIG. 1. The multi-head is formed by bonding a glass plate 27 having a number of grooves 26 to a heating head 28 similar to the head as illustrated in FIG. 1. FIG. 4 illustrates an example of an ink-jet recording apparatus in which such a head has been incorporated. In FIG. 4, reference numeral 61 designates a blade serving as a wiping member, one end of which is held and fixed by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at the home position adjacent to the blade 61, and is so constituted that it moves in the direction perpendicular to the direction in which the recording head 65 is moved and comes into contact with the face of the ejection openings to cap it.

Reference numeral 63 denotes an ink-absorbing member provided adjoiningly to the blade 61 and, similar to the blade 61, held in such a form that it protrudes into the course through which the recording head 65 is moved. The above-described blade 61, cap 62 and absorbing member 63 constitute an ejection-recovery portion 64, where the blade 61 and absorbing member 63 remove water, dust and/or the like from the face of the ejecting openings. Reference numeral 65 designates the recording head having an ejection-energy-generating means and serving to eject the ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. Reference numerals 51 and 52 denote a feeding part from which the recording media are separately inserted, and feed rollers driven by a motor (not illustrated), respectively.

With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
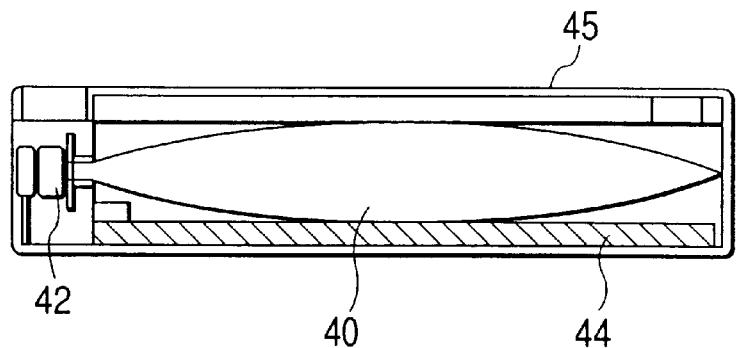
FIG. 5 is a longitudinal cross-sectional view illustrating an ink-jet cartridge according to an embodiment.
Figure 6:
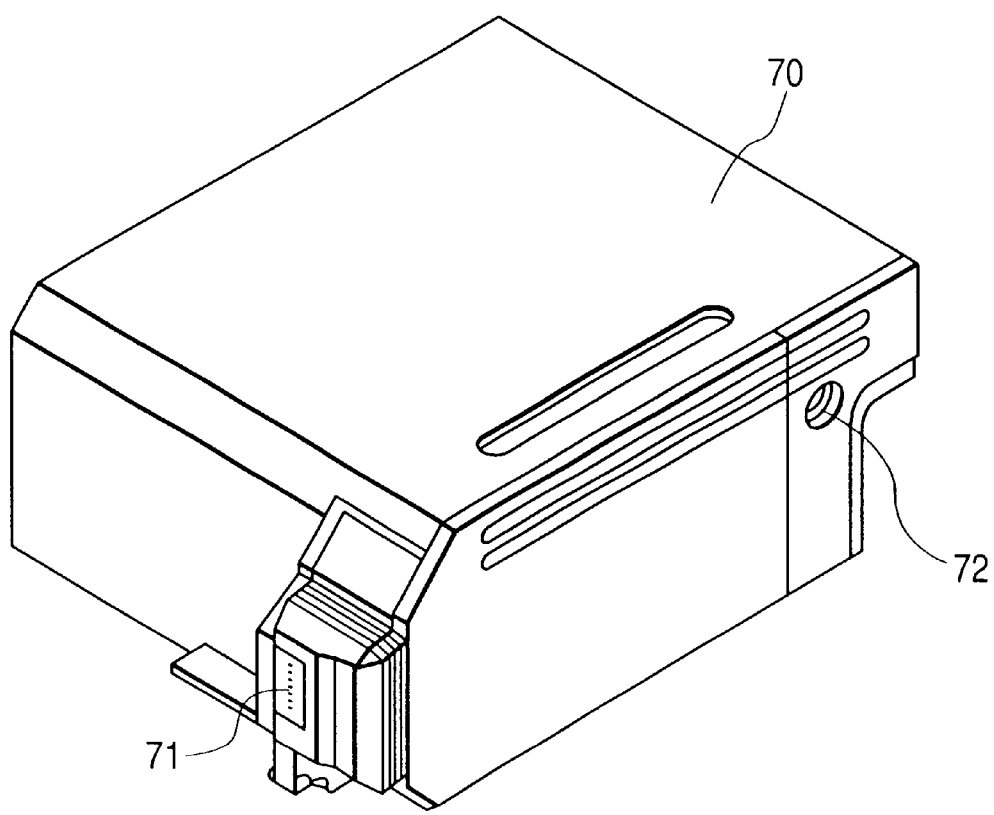
FIG. 6 is a perspective view illustrating an exemplary recording unit.

FIG. 5 illustrates an exemplary ink cartridge 45 in which an ink to be fed to a recording head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at its surface with which the ink comes into contact. The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head portion 71 having a plurality of orifices. In the present invention, polyurethane is preferably used as a material for the ink-absorbing member. The recording unit 70 may be so constructed that the ink container portion is a bag for the ink in the interior of which a spring or the like is provided, not the ink-absorbing member. Reference numeral 72 indicates an air passage for communicating the interior of the recording unit 70 with the atmosphere. This recording unit 70 can be used in place of the recording head 65 shown in FIG. 4, and is detachably installed on the carriage 66.

As described above, the inks according to the present invention can provide images excellent in character quality and fastness properties such as water fastness and light fastness. Further, the inks can be ejected in a stable ejection quantity. As a result, images excellent in fastness properties such as water fastness and light fastness and high in quality can be stably formed by ink-jet recording.

The present invention will hereinafter be described more specifically by the following Examples and Comparative Example. However, the present invention is not limited to and by these examples so far as the subject matter of the present invention is not overstepped. Incidentally, all designations of "part" or "parts" and "%" as will be used in the following examples mean part or parts by weight and % by weight unless expressly noted.

PREPARATION EXAMPLE (Pigment dispersion)

To a solution of 5 g of concentrated hydrochloric acid in 5.3 g of water were added 1.58 g of anthranilic acid at 5° C. The mixture was stirred in an ice bath, thereby always holding it at 10° C. or lower. In this state, a solution with 1.78 g of sodium nitrite dissolved in 8.7 g of water at 5° C. was added. After stirring the resultant mixture for 15 minutes, 20 g of carbon black having a surface area of 320 m$^2$/g and a DBP oil absorption of 120 ml/100 g were further added to the mixture with stirring. The resultant mixture was stirred for additional 15 minutes. After completion of the stirring, the resultant slurry was filtered through Toyo Filter Paper No. 2 (product of Advantes Co.), and the resultant pigment particles were fully washed with water and dried in an oven controlled to 110° C. Additional water was added to the dry pigment to prepare an aqueous dispersion of the pigment having a pigment concentration of 10%. The above-described process was followed to introduce —Ph—COONa into the surface of the carbon black.

EXAMPLE

Components set forth in Table 1 shown below were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

TABLE 1

| Component | Composition |
| --- | --- |
| Pigment dispersion obtained in Preparation Example | 30 parts |
| Ca(OH)$_2$; 0.01% aqueous solution | 2 parts |
| Thiodiglycol | 6 parts |
| Diethylene glycol | 6 parts |
| Triethylene glycol | 7 parts |
| Water | 49 parts |

COMPARATIVE EXAMPLE

Components set forth in Table 2 shown below were mixed and thoroughly stirred into a solution. The resultant solution was then filtered under pressure through a microfilter (product of Fuji Photo Film Co., Ltd.) having a pore size of 3.0 μm, thereby preparing a comparative ink.

TABLE 1

| Component | Composition |
| --- | --- |
| Pigment dispersion obtained in Preparation Example | 30 parts |
| Thiodiglycol | 6 parts |
| Diethylene glycol | 6 parts |
| Triethylene glycol | 7 parts |
| Water | 51 parts |

Each of the inks obtained in Example and Comparative Example was charged into an ink cartridge for an ink-jet recording apparatus (BJC-400, trade name, manufactured by Canon Inc.) having an On-Demand type multi-recording head which ejects an ink by applying thermal energy in response to recording signals to the ink. The cartridge was installed in the ink-jet recording apparatus. Drive conditions for the recording head of the ink-jet recording apparatus, namely, energizing conditions for a heat-generating means (heater) were preset as follows:

Applied voltage: 24 V;

Pulse width: 4.5 μs; and

Drive frequency: 6.25 kHz.

With respect to each of the inks thus obtained, 5 nozzles from which the ink was ejected in a large number of pulses ($1 \times 10^7$), and 5 nozzles from which the ink was ejected in a small number of pulses ($1 \times 10^2$) were provided and then the ink is ejected from these nozzles, and thereafter, the surface of a heater of each nozzle was observed through a microscope. As a result, in the ink according to Example, there was little difference in form between pigment films deposited on the respective heater surfaces irrespective of the number of pulses. However, a difference was observed in the comparative ink.

If the pigment films deposited on the heater surfaces of the respective nozzles greatly differ with the number of pulses when the respective inks are ejected from the nozzles in different large and small numbers of pulses, there is a strong probability that a difference in ejection quantity between the nozzles will become great. If there is little difference in condition between the pigment films deposited on the heater surfaces, there is a strong probability that a difference in the ejection quantity will be slight or little. This fact revealed that the ink according to Example is superior in the stabilization of ink ejection quantity from nozzles to the comparative ink.

What is claimed is:

1. An aqueous ink for ink jet printing comprising: an aqueous medium; calcium; and self-dispersing carbon black to whose surface a hydrophilic group is bound.

2. The ink according to claim 1, wherein the carbon black has an atomic group between the hydrophilic group and the surface of the carbon black.

3. The ink according to claim 2, wherein the atomic group is a linear or branched alkylene group having 1 to 12 carbon atoms, a substituted or unsubstituted phenylene group, or a substituted or unsubstituted naphthylene group.

4. The ink according to claim 1, wherein the hydrophilic group is at least one selected from the group consisting of the following groups: —COOM, —SO$_3$M, —PO$_3$HM, —PO$_3$M$_2$, —SO$_2$NH$_2$, —SO$_2$NHCOR, —NH$_3^+$, —NR$_3^+$,

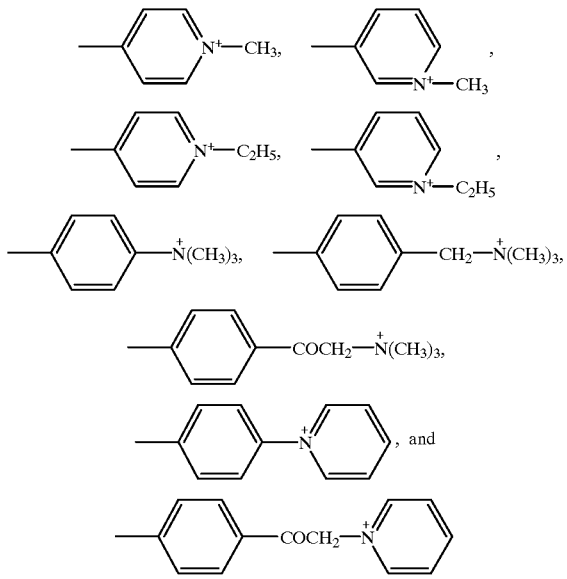

wherein M is hydrogen, alkali metal, ammonium or organic ammonium, and R is an alkyl group having 1 to 12 carbon atoms, a substituted or unsubstituted phenyl group, or a substituted or unsubstituted naphthyl group.

5. The ink according to claim 1, wherein the calcium is present as a calcium ion in the aqueous medium.

6. An inkjet recording process, comprising the step of applying energy to an ink to eject the ink from an orifice toward a recording medium, thereby making a record on the recording medium, wherein the ink comprises an aqueous medium, calcium, and a self-dispersing carbon black to whose surface a hydrophilic group is bound.

7. The ink-jet recording process according to claim 6, wherein the energy is thermal energy.

8. A recording unit comprising: an ink container portion containing ink; and a head portion from which the ink is ejected, wherein the ink comprises an aqueous medium, calcium, and self-dispersing carbon black to whose surface a hydrophilic group is bound.

9. An ink cartridge comprising an ink container portion containing ink, wherein the ink comprises an aqueous medium, calcium, and self-dispersing carbon black to whose surface a hydrophilic group is bound.

10. The ink cartridge according to claim 9, which is detachable from a recording head for ejecting the ink from an orifice by applying energy to the ink, and wherein said ink cartridge further comprises means for feeding the ink to the recording head.

11. An ink-jet recording apparatus comprising: a recording unit having an ink container portion containing ink comprising an aqueous medium, calcium, and self-dispersing carbon black to whose surface a hydrophilic group is bound; and a recording head for ejecting the ink from an orifice by applying energy to the ink fed from the ink container portion.

12. An ink-jet recording apparatus comprising: an ink cartridge equipped with an ink container portion containing ink comprising an aqueous medium, calcium, and self-dispersing carbon black to whose surface a hydrophilic group is bound; and a recording head for ejecting the ink from an orifice by applying energy to the ink fed from the ink container portion.

13. The ink-jet recording apparatus according to claim 11 or 12, wherein the energy is thermal energy.

14. The ink-jet recording apparatus according to claim 13, further comprising heat-generating means as a means for applying the thermal energy to the ink.

15. The ink-jet recording apparatus according to claim 12, further comprising an ink-feeding portion for feeding the ink contained in the ink cartridge to the recording head.

* * * * *